(12) United States Patent
Soliman Abdalla et al.

(10) Patent No.: US 8,172,163 B2
(45) Date of Patent: May 8, 2012

(54) SYSTEM AND METHOD FOR PRODUCING NANOMATERIALS

(75) Inventors: Soliman Mahmoud Soliman Abdalla, Alexandria (EG); Fahad M. M. Al-Marzouki, Jeddah (SA); Ali Mohamed Abdel-Daiem, Zagazig (EG)

(73) Assignee: King Abdulaziz University, Jeddah (SA)

( * ) Notice: Subject to any disclaimer, the term of this patent is extended or adjusted under 35 U.S.C. 154(b) by 164 days.

(21) Appl. No.: 12/659,808

(22) Filed: Mar. 22, 2010

(65) Prior Publication Data

US 2011/0226609 A1    Sep. 22, 2011

(51) Int. Cl.
*B02C 19/00*    (2006.01)
(52) U.S. Cl. .................. 241/1; 241/5; 241/39; 241/301
(58) Field of Classification Search ............. 241/1, 301, 241/5, 39, 21
See application file for complete search history.

(56) References Cited

U.S. PATENT DOCUMENTS

| | | | |
|---|---|---|---|
| 6,346,023 B1 | 2/2002 | Tsuboi et al. | |
| 6,415,996 B1 * | 7/2002 | Adair et al. | ..................... 241/16 |
| 6,509,067 B2 | 1/2003 | Halpern | |
| 7,067,096 B2 | 6/2006 | Iijima et al. | |
| 7,300,958 B2 | 11/2007 | Kataoka et al. | |
| 7,455,573 B2 | 11/2008 | Huang et al. | |
| 2003/0168538 A1 * | 9/2003 | Dobson | ........................... 241/21 |
| 2005/0084607 A1 | 4/2005 | Wang | |
| 2006/0086646 A1 * | 4/2006 | Patist et al. | ................... 209/164 |
| 2006/0130942 A1 | 6/2006 | Ishikawa et al. | |
| 2008/0057840 A1 | 3/2008 | Huang et al. | |
| 2008/0078518 A1 * | 4/2008 | Goto et al. | ..................... 162/189 |
| 2008/0197218 A1 | 8/2008 | Ishigaki et al. | |
| 2008/0279756 A1 | 11/2008 | Zhamu et al. | |

FOREIGN PATENT DOCUMENTS

| | | |
|---|---|---|
| EP | 1961486 A3 | 8/2009 |
| WO | WO2008028293 A1 | 3/2008 |

OTHER PUBLICATIONS

S.M Booij, H. van Brug, J.J.M. Braat, O.H. Fahnle, "Nanometer Deep Shaping with Fluid Jet Polishing", *Opt Eng* vol. 41 (8), pp. 1926-1931, 2002.

\* cited by examiner

*Primary Examiner* — Bena Miller
(74) *Attorney, Agent, or Firm* — Richard C. Litman

(57) ABSTRACT

This system and method for producing nanomaterials allows for the production of relatively high concentrations of nanoparticles with a minimum of expense, time and energy. Ultrasonic waves, produced at a power of approximately 50 W with a frequency of 26.23 kHz, are projected on a material sample while, simultaneously, a fluid stream jet is projected on the material sample. The ultrasonic waves, in the presence of the fluid jet, create cavities that explode at the surface of the solid material, leading to creation of cracks in the material surface. With the increase in the number of cracks in the material, the solid material erodes. The eroded material, which is on the nanometer scale, is collected on a suitable substrate, such as silicon. This method allows for the preparation of nanoparticles from any solid material, in particular very hard materials, such as diamond, silicon carbide and the like.

17 Claims, 4 Drawing Sheets

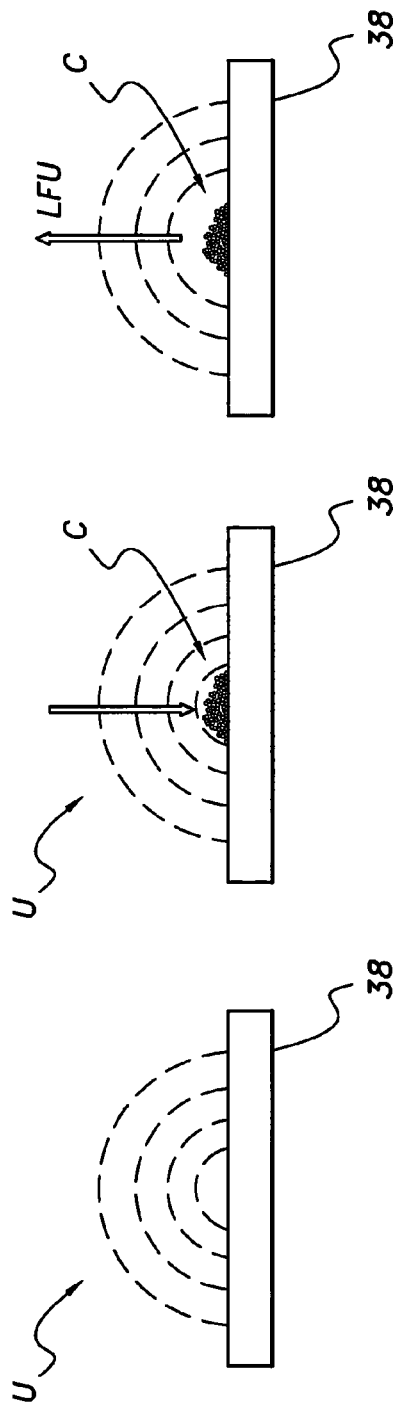
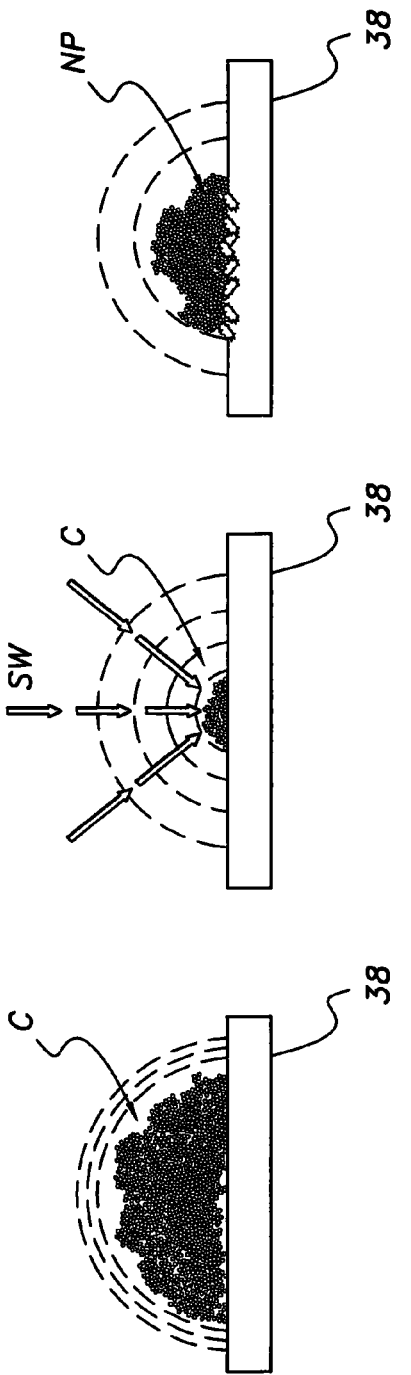
FIG. 3A  FIG. 3B  FIG. 3C
FIG. 3D  FIG. 3E  FIG. 3F

SYSTEM AND METHOD FOR PRODUCING NANOMATERIALS

BACKGROUND OF THE INVENTION

1. Field of the Invention

The present invention relates to nanoparticles, and particularly to a system and method for producing nanomaterials through an erosion process created by a combination of pressurized fluid and ultrasonic waves focused on a material sample that can be used to form nanoparticles, even from hard materials, such as diamonds.

2. Description of the Related Art

FIG. 4 illustrates a typical fluid jet polishing system 100. System 100 includes a part holder 112, which securely holds a component 113 during the erosion process, within a contained area of an erosion chamber 116. The part holder 112 can be fixed within the erosion chamber 116, rotatable relative to the erosion chamber 116 or form part of a moveable platform. Rotating the part holder 112 facilitates the production of annular or arcuate profiles in the component 113, if desired.

A nozzle 117 directs a pressurized fluid jet stream of a working fluid 118 at a surface of the component 113. The working fluid 118 contains a carrier fluid; e.g. water, glycol, oil or other suitable fluids, and small abrasive particles made from harder materials, such as aluminum oxide, diamond and/or zirconium oxide. Varying the type and size of the abrasive particles can be practiced in order to optimize the surface roughness and/or removal rate. The properties of the working fluid 118, including fluid density, viscosity, pH and rheological properties, can be altered in order to optimize the surface roughness and removal rate. In particular, it is advantageous to have a dilatant fluid in order to increase the removal rate. The viscosity of dilatant fluids increases with increasing shear forces, as compared to normal fluids, in which viscosity is independent of shear forces. Thus, when a fluid jet stream, including a dilatant fluid, impacts on the component 113, the working fluid 118 experiences high shear forces, and therefore has an increase in viscosity, in particular at an interface between the pressurized stream of working fluid 118 and the surface of the component 113.

Abrasive particles that normally have very little effect on the component 113 work much better when a dilatant additive; e.g., corn starch or poly vinyl alcohol, is added. Poly vinyl alcohol is a long chain molecule that can be cross linked to form larger molecules, all with varying degrees of dilatant property. Multiple axis (3, 4, 5 or 6) motion systems may be used to process a wide variety of component shapes. A mechanical linkage 120 may also be added to maintain the angle of the nozzle 117 over spherical or aspheric components 113, and thereby reduce the need for multi-axis motion control systems. During erosion, the end of the nozzle 117 and the component 113 are preferably submerged within the working fluid 118, such that ambient air is not introduced into the closed loop of working fluid slurry. Any air bubbles that are present in the system simply bubble to an air pocket 115 at the top of the erosion chamber 116 and are not re-circulated, thereby producing surfaces with very smooth surface finishes.

The air pocket 115 can be vented continuously or at time intervals. A drain pipe 119 at the bottom of the erosion chamber 116 evacuates the erosion chamber 116 and passes the working fluid 118 with eroded particles from the component 113 to a pump 121, which re-pressurizes the working fluid 118. Plumbing pipes 122 are used to return the working fluid 118 back to the nozzle 117.

A motion system 123, which is typically computer-controlled, e.g., by computer 150, directs the nozzle 117 in the x-y directions, or in any suitable manner (such as three-dimensionally, rotationally, etc.) over the component 113 in accordance with the desired pattern and smoothness on the surface of the component 113. Alternatively, in systems in which the nozzle 117 is fixed and the part holder 112 is movable, the motion system 123 directs the movable platform of the part holder 112 as desired to obtain the required surface shape and roughness.

A property controller 124, including switch 125 and a pair of bypass pipes, may be added to control any one or more of the various properties of the working fluid 118, e.g., temperature, fluid density, viscosity, or pH. If temperature control is required, a temperature sensor in the switch 125 determines the temperature of the working fluid 118 and reroutes all or a portion of the working fluid 118 through the property controller 124 via the bypass pipe, where the temperature of the working fluid 118 is adjusted higher or lower using suitable heating or cooling means. The thermally altered working fluid is passed back to the plumbing 122 via the return bypass pipe. The temperature of the working fluid 118 can be adjusted in order to optimize the removal rate of the component particles and/or the surface roughness of the component 113.

In particle heating or cooling, the tip of the nozzle 117 can affect the properties of the working fluid slurry, thereby increasing or decreasing the removal rate, i.e., cooling the working fluid 118 will lead to a stiffer slurry and an increased removal rate. The property controller 124 can alternatively or also include means for altering the pH of the working fluid 118 by adding high or low pH materials thereto for optimizing the removal rate of component material and the surface roughness of the finished product.

The pump 121 maintains a constant pressure during a single stroke of the fluid jet nozzle 117, and reverses direction after completion of a stroke. The pump 121 includes first and second pumping chambers 132 and 133, respectively, each with a diaphragm 134 and 135 for expanding and/or contracting the volume of the respective pumping chamber 132 and 133. The diaphragms 134 and 135 may be driven electrically, pneumatically or hydraulically. The direction of the pump 121 is coordinated with the fluid jet polishing to ensure that the pressure at the nozzle 117 is constant during a single translation of the nozzle 117 over the workpiece 113.

The pump 121 includes a hydraulic (or pneumatic) actuator pump 137, which drives a hydraulic (or pneumatic) working fluid 139 from the upper part of the first pumping chamber 132, actuating the first diaphragm 134 to expand the volume of the lower part of the first pumping chamber 132. The hydraulic working fluid 139 is forced into the upper part of the second pumping chamber 133, forcing the second diaphragm 135 to contract the volume of the lower part of the second pumping chamber 133, pressurizing and forcing the abrasive fluid 118 through an output conduit 141 to the nozzle 117.

When the hydraulic actuator pump 137 is actuated in the aforementioned direction, a valve assembly 140 is set in a first position (shown in dotted lines) in which the abrasive fluid 118 flows from the drain 119 to the bottom of the first pumping chamber 132, and abrasive fluid 118 flows from the lower part of the second pumping chamber 133 through the output conduit 141 to the nozzle 117. On the next stroke, the hydraulic actuator pump 137 pumps the hydraulic working fluid 139 in the reverse direction, i.e., from the top of the second pumping chamber 133 to the top of the first pumping chamber 132, and the valve assembly 140 ensures that the abrasive fluid 118 flows from the drain 119 to the bottom of the second pumping chamber 133, and from the bottom of the first pumping chamber 132 to the nozzle 117 via the output conduit 141 (shown by solid curved arrows).

The second diaphragm 135 rises to increase the volume of the lower part of the second pumping chamber 133, creating a suction force on the abrasive fluid 118, while the first diaphragm 134 is lowered to decrease the volume of the lower part of the first pumping chamber 132, thereby pressurizing the abrasive fluid 118. Such a typical fluid jet polishing system is shown in U.S. Pat. No. 7,455,573, which is hereby incorporated by reference in its entirety. In such fluid jet polishing systems, the fluid jet stream is highly controllable and produces a controlled polished surface, but the waste products are generally disposed of. Such waste products, however, with some processing, may include valuable materials, and it would be desirable to modify such a fluid jet polishing system to create highly desirable products, such as nanoparticles, from what the polishing system considers as waste.

Thus, a system and method for producing nanomaterials solving the aforementioned problems is desired.

SUMMARY OF THE INVENTION

This system and method for producing nanomaterials allows for the production of relatively high concentrations of nanoparticles with a minimum of expense, time and energy. Ultrasonic waves, produced at a power of approximately 50 W with a frequency of 26.23 kHz, are projected on a material sample while, simultaneously, a fluid stream jet is projected on the material sample. The ultrasonic waves, in the presence of the fluid jet, create cavities that explode at the surface of the solid material, leading to the creation of cracks in the material surface. With the increase in the number of cracks in the material, the solid material erodes. The eroded material, which is on the nanometer scale, is collected on a suitable substrate, such as silicon. This method allows for the preparation of nanoparticles from any solid material, in particular very hard materials, such as diamond, silicon carbide and the like.

The system includes a housing having an upper wall, a lower wall and at least one sidewall, the housing defining an open interior region therein. An ultrasonic transducer is mounted to an inner surface of the lower wall for generating focused ultrasonic waves. The material sample is mounted to an inner surface of the upper wall for impingement thereon by the focused ultrasonic waves.

A nozzle is mounted adjacent the material sample and the pressurized fluid is selectively projected through the nozzle and onto the material sample. A slurry containing a mixture of the fluid and nanoparticles is created by the erosion of the material sample under the influence of the focused ultrasonic waves and the pressurized fluid. The slurry is then collected, and the nanoparticles are removed therefrom, such as by precipitation onto the silicon substrate.

These and other features of the present invention will become readily apparent upon further review of the following specification and drawings.

BRIEF DESCRIPTION OF THE DRAWINGS

FIGS. 3A, 3B, 3C, 3D, 3E and 3F illustrate the nanoscopic-scale steps of generating nanoparticles using the system for producing nanomaterials of FIG. 1.

Similar reference characters denote corresponding features consistently throughout the attached drawings.

DETAILED DESCRIPTION OF THE PREFERRED EMBODIMENTS

Figure 1:
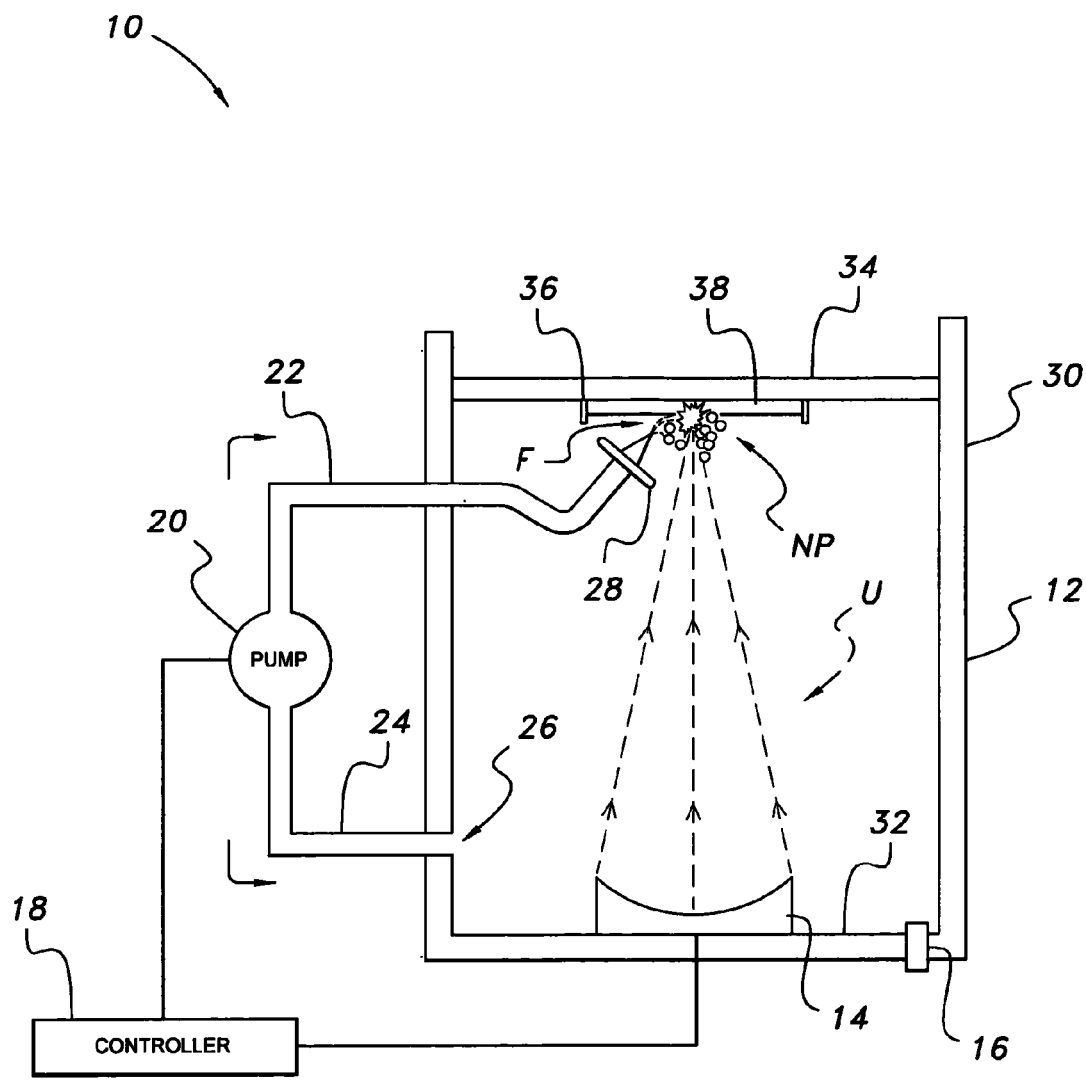
FIG. 1 is a diagrammatic view of a system for producing nanomaterials according to the present invention.

FIG. 1 illustrates a system for producing nanomaterials 10. A hollow housing 12 is provided, the housing 12 being formed from stainless steel or any other suitable material that will not rust, corrode or react with the fluids and nanomaterials to be described in detail below. The housing 12 includes a lower wall 32, at least one sidewall 30 and an upper wall 34 forming an enclosure that defines an open, interior region therein.

A material sample 38 is releasably secured to the inner surface of the upper wall 34 by a sample holder 36, which may be a clip, a clamp or any other suitable releasable holder for grasping a material sample. Sample 38 is the raw material sample from which the nanomaterials will be produced. The sample holder 36 may be fixed with respect to upper wall 34, may be selectively and controllably rotatable relative to upper wall 34, or may form part of a movable platform. Preferably, the sample holder 36 is rotatable, allowing for user control over the size of the nanoparticles produced by the system 10. The sample holder 36 may be manually rotated or may be driven by any suitable rotation drive system, such as an external motor, controlled by a controller 18 (to be described in detail below).

A nozzle 28 directs a pressurized fluid jet stream of a working fluid F at the exposed surface of the solid material sample 38, as illustrated. The working fluid F is initially a fluid in its pure form, such as water, glycol, oil or any other suitable fluid. Following erosion of the solid material sample 38, the eroded material is mixed with the fluid, leading to the formation of viscous slurry.

Although the shape and relative dimensions of housing 12 may be varied, in the preferred embodiment, the dimensions of the housing 12 are linearly dependent upon the wavelength $\lambda$ (or, alternatively, the frequency f) of the ultrasonic wave (to be described in detail below). For example, if the frequency f of the ultrasonic wave U is 26.32 kHz, then dimensions are preferably given by some multiple n of $\lambda$ (or, given frequency f, using the relation that $$\lambda = \frac{c}{f},$$

where c is the speed of sound), such that, in this example, $$n\lambda = \frac{n \cdot 1500 \text{ m/s}}{26.32 \times 10^3 \text{ Hz}} = 5.7 \; n \text{ cm.}$$

This leads to a housing diameter of 8.55 cm (where n=1.5 for a cylindrical housing), a height of 42.75 cm (with n=7.5), and a thickness of approximately 2 mm. These dimensions permit the solid material sample to receive the maximum intensity of the ultrasonic wave U. As noted above, the material forming housing 12 is selected to be chemically inert with respect to the material to be eroded (from sample 38), as well as the working fluid F.

A pump 20 is provided to pressurize the working fluid F. As shown, the slurry resulting from fluid F impinging upon the sample 38 and formed as a mixture of the fluid F and the eroded material is preferably recycled, the slurry passing through an outlet port 26 formed through sidewall 30, and driven by pump 20 via conduit 24 to be forced through a second conduit 22, which terminates in nozzle 28.

A piezoelectric transducer 14 is attached to the inner surface of the lower wall 32, as shown, and may be driven at 26.32 kHz, as given in the above example. It should be understood that any suitable piezoelectric transducer capable of delivering focused ultrasonic waves U may be utilized.

Figure 2:
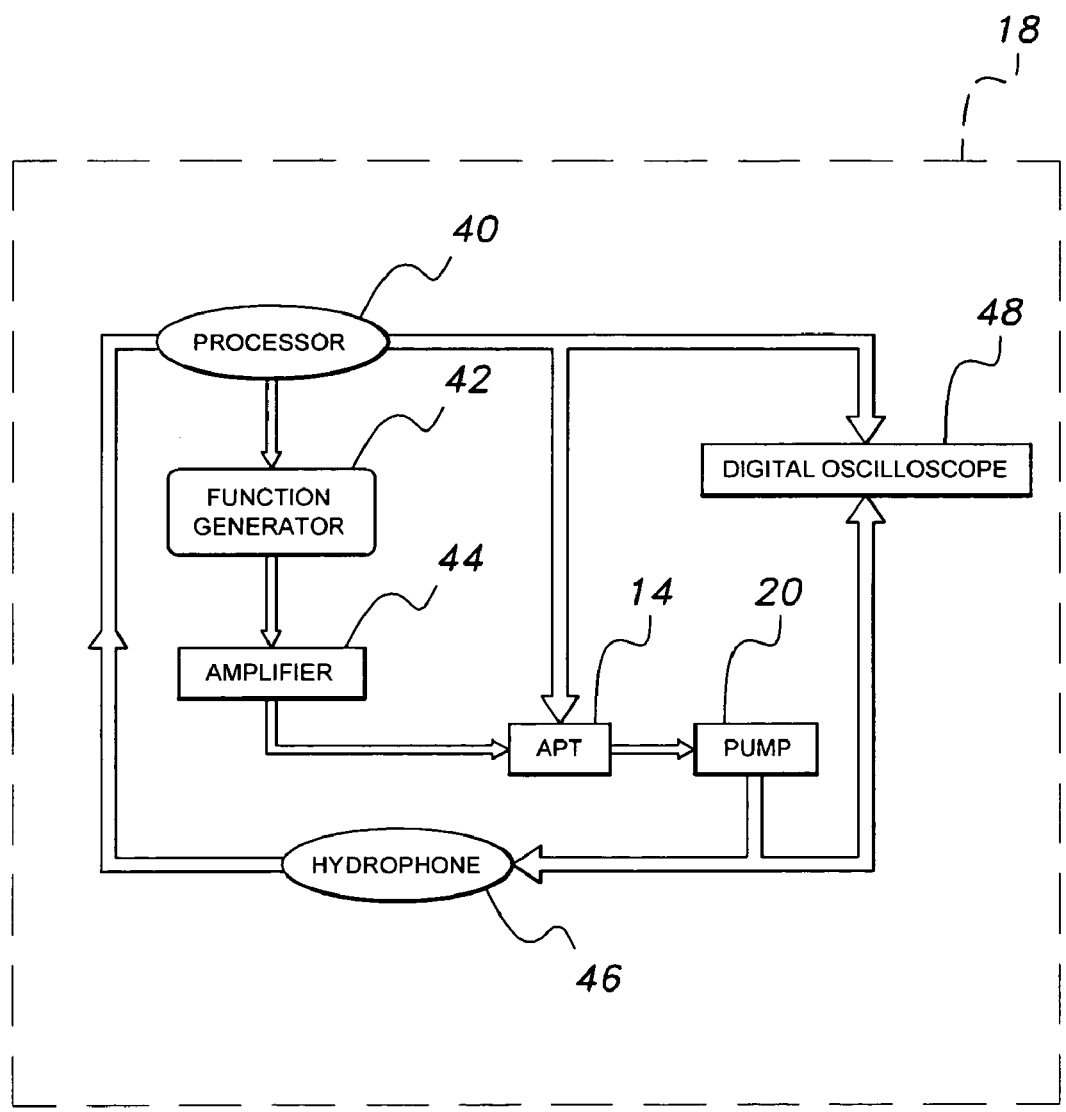
FIG. 2 is a block diagram of the components of a controller of the system for producing nanomaterials of FIG. 1.
Figure 4:
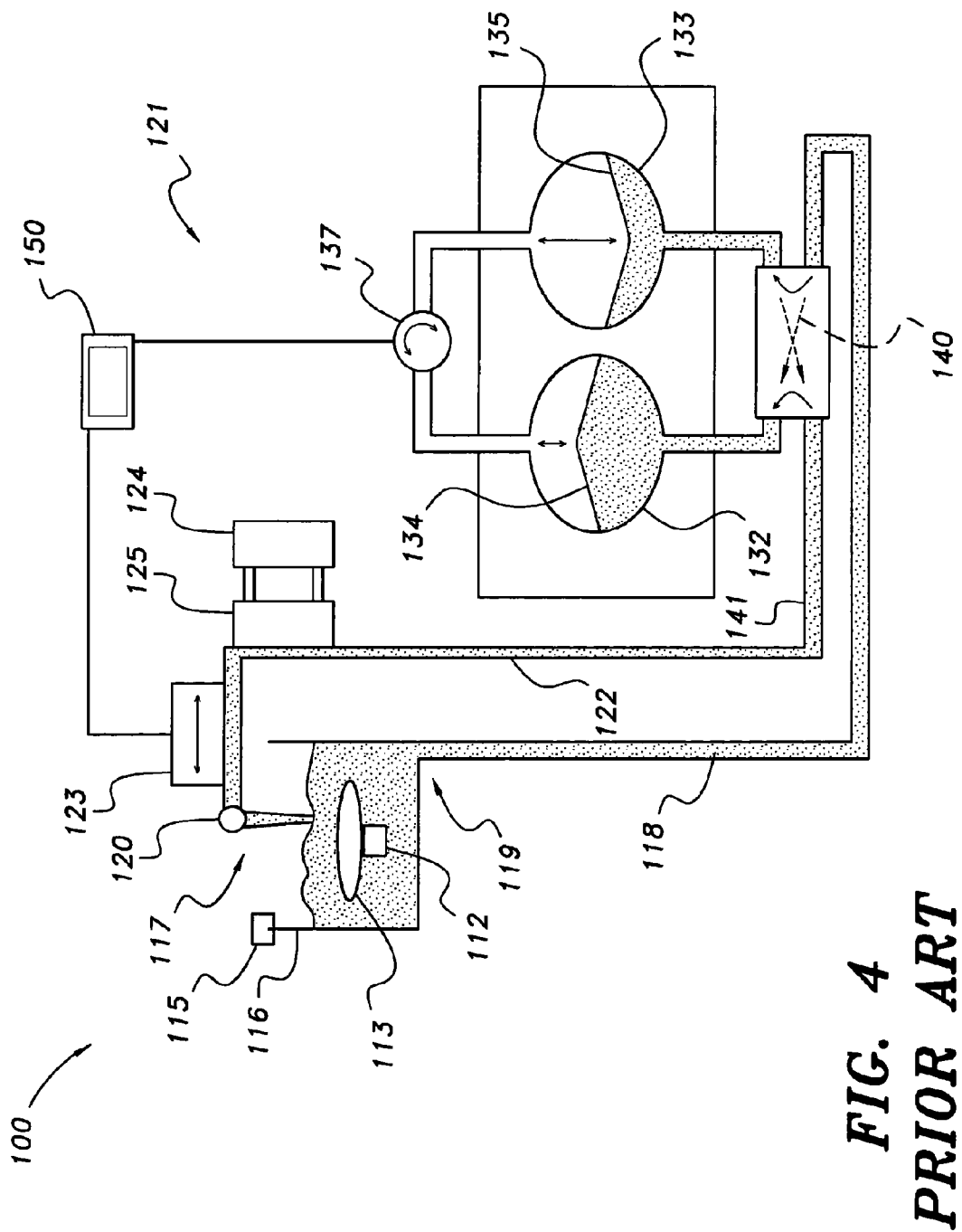
FIG. 4 is a diagrammatic view of a typical prior art system for fluid jet polishing.

In use, the ultrasonic waves are focused on the exposed surface of the material sample 38. A controller 18 scans suitable values of ultrasonic wave intensity and/or frequency, along with optimal values of pressure for the fluid jet, for producing the desired nanoparticle sizes. As shown in FIG. 2, the controller 18 includes a processor 40, which may be any suitable type of computer processor, such as that associated with a separate personal computer or the like, or may be any other suitable type of processor or logic controller, such as a programmable logic controller (PLC) or the like. The processor 40 initiates functioning of the piezoelectric acoustic transducer 14 via triggering of a function generator 42, which may be any suitable type of function generator.

The processor 40, in conjunction with function generator 42, establishes a time axis, which may be visually represented on a digital oscilloscope 48, and searches for the optimal values of ultrasonic intensity within housing 12 to produce nanoparticles of a predetermined, optimal size. The solid material sample 38 is positioned horizontally within the housing 12, as shown, at a calibrated position selected such that cavitation and the pressure field are not disturbed due to axis-symmetric geometry. The function generator may have an associated signal amplifier 44, which feeds control signals, ultimately generated by processor 40, to the acoustic piezoelectric transducer (APT) 14 and pump 20.

The housing 12 is initially calibrated before measuring cavitation noise therein. In order to accomplish this, the housing 12 may be completely filled with water (from a tap or any other suitable source), and the water is allowed to stand undisturbed in the basin for approximately two hours to avoid interference from large bubbles. Following this, a hydrophone 46, or the like, is utilized (via the reflector of the preferably concave piezoelectric transducer 14), to find the positions of the maxima of ultrasonic intensities within housing 12.

Typically, the maxima of intensity are found to lie at distances of $(n+0.5)\lambda$ from the transducer 14; i.e., from the example given above, the intensity maxima are found at 2.85 cm, 8.55 cm, 14.25 cm, 19.95 cm, 25.65 cm, 31.34 cm and 37.00 cm, respectively, above the center of the concave transducer 14. The hydrophone 46 is gradually moved along the housing 12 and is finally positioned in the location of maximum ultrasonic wave intensity. The distance between the final position of hydrophone 46 and the bottom wall 32 remains fixed for all subsequent measurements. The material holder 36 is positioned at this experimentally found location of maximum ultrasonic wave intensity.

Cavitation noise is then recorded with a broad band hydrophone, preferably with a flat frequency-response curve up to 500 kHz. This frequency response of the hydrophone allows for detection of the first harmonics of the fundamental component with equal sensitivity. The signal received by the hydrophone 46 is fed to the input of the digital oscilloscope 48. Preferably, the oscilloscope memory (or memory of an associated component, such as a personal computer containing processor 40) has a storage capacity allowing for the recordation of approximately two million data points.

The pressure of the slurry produced by the mixture of fluid F and the eroded material from sample 38 may be varied, as desired, in order to control the size of the produced nanoparticles. With the aid of the hydrophone 46 and the oscilloscope 48, the cavitation noise is measured, the cavitation noise decreasing as the viscosity of the slurry increases. The concentration of the nanoparticles within the slurry increases with time and/or viscosity of the slurry. At the desired concentration of nanoparticles, the slurry is collected from the bottom of housing 12, via tape 16, or any other suitable type of collector or filter, and the nanoparticles are precipitated therefrom by sedimentation on a suitable substrate, such as a silicon substrate. As time increases, the nanoparticle concentration increases, along with the viscosity of the slurry, which increases the removed material rate. It should be understood that both the nozzle 28 and the position of the acoustic piezoelectric transducer (APT) 14 may be varied, depending upon the nanomaterial production needs, such as nanoparticle size and yield.

Due to acoustic energy loss within housing 12 (in the form of heat), the housing 12 is preferably constantly cooled to prevent effervescence and evaporation of the liquids contained therein. The controller 18 may have a temperature controller integrated therein for maintaining the fluid F at a constant desired temperature.

The material removal rate from sample 38 depends on a number of different parameters. In order to properly model the formation of the nanomaterials, the fluid jet is represented as being composed of N perfect and equal spheres, each having a radius r, which is measured in meters. Each of these spheres has equal velocity v and kinetic energy density given by $$(K.E)_1 = \frac{1}{2}\rho v^2,$$

where $\rho$ is the fluid density (for purposes of modeling, the fluid F is selected to be water). The total kinetic energy is given by $$K.E = \frac{N}{2}\rho v^2.$$

The fluid stream starts at the nozzle 28 and ends at the surface of the material sample 38, with the trajectory from the nozzle 28 to the material surface being approximately $l=2.3\times10^{-2}$ m. This provides an approximate volume of the fluid as $\pi r^2 l = 1.67\times10^{-7}$ m$^3$, which leads to a kinetic energy of approximately 0.2 J. Thus, the surface energy is given as $$\frac{0.2}{\pi(1.5\times10^{-3})^2} = 1.25$$

MPa. Next, conservation of energy is applied to both ends of the fluid stream and Bernoulli's equation is applied:

$$\left(\frac{N}{2}\rho v^2\right)_{initial} + \Delta E_{USB} + P_0 = \left(\frac{N}{2}\rho v^2\right)_{final} + \Delta E_{Surface} + P_{final},$$

where $\Delta E_{USB}$ is the impact energy of the ultrasonic beam U on the surface of the material 38, and $\Delta E_{surface}$ is the surface binding energy of the atoms in the solid material surface. $P_0$ and $P_{final}$ are the initial and final pressure of the slurry at the nozzle and at the surface of the sample 38, respectively. It is well-known that nanocrystalline aggregated diamond nanorods have a fracture toughness of approximately 11.1±1.2 MPa, which exceeds that of natural and synthetic diamond (which varies from 3.4 to 5.0 MPa) by 2 to 3 times. Thus, $\Delta E_{Surface}$ is considered to be in the range of approximately 22 to 33 MPa, and $\Delta E_{USB}$ is estimated to be at a maximum of 33 MPa. Thus, the intensity of ultrasonic beam U is sufficient to perform, at least, the first fracture in the solid surface. Generally, the first fracture in a material caused by an external energy source depends on the amount of energy applied to the surface, the rate at which it is applied and the manner in which it is applied.

Cavitation, referenced above, is the phenomenon of sequential formation, growth and collapse of millions of microscopic vapor bubbles (or voids) in a liquid. The collapse or implosion of these cavities creates high localized temperatures, roughly on the order of 14,000 K, with a pressure of approximately 10,000 atmospheres, resulting in short-lived and highly localized hot spots in a cold liquid. Thus, cavitation serves as a method of concentrating the diffused fluid energy locally, in very short durations, creating a zone of intense energy dissipation.

Cavitation is induced by passing high frequency sound waves (on the order of 16 kHz-100 MHz; i.e., ultrasonic waves) through liquid media. When ultrasonic waves pass through the liquid media, in the rarefaction region, local pressure falls below the threshold pressure for the cavitation (typically the vapor pressure of the medium at the operating temperature), and millions of cavities are generated. In the compression region, the pressure in the fluid rises and these cavities are collapsed. The collapse conditions depend on the intensity and frequency of the ultrasonic waves, as well as the physical properties of the liquid, the temperature of the liquid, and any gases dissolved therein.

During cavitation, the relatively low average energy density of the acoustic field is transformed into a high energy density field inside and near the bubble. During the collapse of cavitation bubbles in the liquid medium, pressures on the order of several MPa and temperatures on the order of $10^4$ K are generated. FIGS. 3A-3F illustrate the erosion of material from sample 38 to form the resultant nanomaterials. In FIG. 3A, ultrasonic waves W are directed toward the solid material surface. The intense ultrasonic energy is suddenly stopped by the atoms at the surface of sample 38, thus dividing the energy into three parts: the first part is reflected ultrasonic waves (having a relatively low frequency, illustrated as LFU in FIG. 3C), the second part is absorbed by the surface atoms, and the third part of the ultrasonic energy is absorbed by the fluid adjacent the surface.

As shown in FIG. 3B, the fluid adjacent the surface is almost instantaneously evaporated, leading to the formation of a cloud of bubbles C. The reflected ultrasonic waves LFU interfere with the incident waves U, leading to bubble cloud forced oscillations, which leads to the formation of a shock wave with a very high energy (illustrated in FIG. 3D). This energy is absorbed by the surface of the material, thus crushing the material. FIG. 3E illustrates the shockwave SW propagating inwardly, compressing the hemispherical bubble cloud C, with the pressure being so great as to create nanoparticles NP at the surface of material 38 (shown in FIG. 3F). These nanoparticles NP are washed away with the fluid F to form the slurry, collected by tape 16.

The first crack in material sample 38 occurs with the application of approximately 22 to 33 MPa, created by the inwardly propagating shockwave. Such pressures are ordinarily very difficult to generate (which is why nanoparticles in general are extremely difficult to produce), but system 10 allows for the generation of relatively large concentration of nanoparticles NP through the usage of only pressurized fluid and projected ultrasound U.

It is to be understood that the present invention is not limited to the embodiment described above, but encompasses any and all embodiments within the scope of the following claims.

We claim:

1. A system for producing nanomaterials, comprising:
a housing having an upper wall, a lower wall and at least one sidewall, the housing defining an open interior region therein;
an ultrasonic transducer mounted to an inner surface of the lower wall for generating focused ultrasonic waves;
a material sample mounted to an inner surface of the upper wall for impingement thereon by the focused ultrasonic waves;
a nozzle mounted adjacent the material sample;
means for selectively projecting pressurized fluid through the nozzle and onto the material sample, whereby a slurry containing a mixture of the fluid and nanoparticles created by the erosion of the material sample under the influence of the focused ultrasonic waves and the pressurized fluid is created; and
means for collecting the slurry for removal of the nanoparticles therefrom.

2. The system for producing nanomaterials as recited in claim 1, further comprising a sample holder secured to the inner surface of the upper wall for releasably holding the material sample.

3. The system for producing nanomaterials as recited in claim 2, wherein said ultrasonic transducer comprises a concave piezoelectric transducer.

4. The system for producing nanomaterials as recited in claim 3, wherein said housing is substantially cylindrical.

5. The system for producing nanomaterials as recited in claim 4, wherein said housing has a diameter, the diameter being a multiple of a wavelength of the ultrasonic waves produced by the concave piezoelectric transducer, the diameter being selected to produce an ultrasonic energy intensity maximum at an exposed surface of the material sample.

6. The system for producing nanomaterials as recited in claim 5, wherein said housing has a height, the height being a multiple of the wavelength of the ultrasonic waves produced by the concave piezoelectric transducer, the height being selected to produce an ultrasonic energy intensity maximum at the exposed surface of the material sample.

7. The system for producing nanomaterials as recited in claim 1, wherein said housing has a slurry outlet port formed therein, said means for selectively projecting the pressurized fluid through said nozzle and onto the material sample comprising:
a pump;
an intake conduit extending from the slurry outlet port to the pump; and an outlet conduit leading from the pump to the open interior region of said housing, the outlet conduit terminating in said nozzle.

8. The system for producing nanomaterials as recited in claim 7, further comprising means for selectively controlling the pressure of the pressurized fluid driven by the pump.

9. The system for producing nanomaterials as recited in claim 8, further comprising means for selectively controlling the wavelength and the intensity of the focused ultrasonic waves.

10. A system for producing nanomaterials, comprising:
- a housing having an upper wall, a lower wall and at least one sidewall, the housing defining an open interior region therein, the housing having a slurry outlet port formed therethrough;
- an ultrasonic transducer mounted to an inner surface of the lower wall for generating focused ultrasonic waves;
- a material sample mounted to an inner surface of the upper wall for impingement thereon by the focused ultrasonic waves;
- a nozzle mounted adjacent the material sample;
- a pump for selectively projecting pressurized fluid through the nozzle and onto the material sample, whereby a slurry containing a mixture of the fluid and nanoparticles created by the erosion of the material sample under the influence of the focused ultrasonic waves and the pressurized fluid is created;
- an intake conduit leading from the slurry outlet port formed through said housing to the pump;
- an outlet conduit leading from the pump to the open interior region of the housing, the outlet conduit terminating in the nozzle; and
- means for collecting the slurry for removal of the nanoparticles therefrom.

11. The system for producing nanomaterials as recited in claim 10, further comprising a sample holder secured to the inner surface of the upper wall for releasably holding the material sample.

12. The system for producing nanomaterials as recited in claim 11, wherein said ultrasonic transducer comprises a concave piezoelectric transducer.

13. The system for producing nanomaterials as recited in claim 12, wherein said housing is substantially cylindrical.

14. The system for producing nanomaterials as recited in claim 13, wherein said housing has a diameter, the diameter being a multiple of a wavelength of the ultrasonic waves produced by the concave piezoelectric transducer, the diameter being selected to produce an ultrasonic energy intensity maximum at an exposed surface of the material sample.

15. The system for producing nanomaterials as recited in claim 14, wherein said housing has a height, the height being a multiple of the wavelength of the ultrasonic waves produced by the concave piezoelectric transducer, the height being selected so as to produce an ultrasonic energy intensity maximum at the exposed surface of the material sample.

16. The system for producing nanomaterials as recited in claim 10, further comprising means for selectively controlling the pressure of the pressurized fluid driven by the pump.

17. The system for producing nanomaterials as recited in claim 16, further comprising means for selectively controlling the wavelength and the intensity of the focused ultrasonic waves.

* * * * *